United States Patent [19]

Ricciardi et al.

[11] Patent Number: 4,867,343
[45] Date of Patent: Sep. 19, 1989

[54] WILD-FLOW LOSS-IN-WEIGHT WEIGHING SYSTEM

[75] Inventors: Ronald J. Ricciardi, Woodcliff Lake; John Laidlaw, Pompton Plains, both of N.J.

[73] Assignee: Acrison, Inc., Moonachie, N.J.

[21] Appl. No.: 157,230

[22] Filed: Feb. 18, 1988

[51] Int. Cl.⁴ ............................................. B67B 7/00
[52] U.S. Cl. ......................................... 222/1; 222/56; 222/58; 222/63; 222/64; 177/66
[58] Field of Search ............... 222/1, 56, 66, 77, 64, 222/63, 58; 177/66

[56] References Cited

U.S. PATENT DOCUMENTS

| | | | |
|---|---|---|---|
| 2,638,248 | 5/1953 | Alvord | 222/56 |
| 3,253,745 | 5/1966 | Skelton | 222/56 |
| 3,319,828 | 5/1967 | Maxwell | 222/1 |
| 4,524,886 | 6/1985 | Wilson et al. | 222/63 X |
| 4,579,252 | 4/1986 | Wilson et al. | 222/56 X |

Primary Examiner—Joseph J. Rolla
Assistant Examiner—Gregory L. Huson
Attorney, Agent, or Firm—Davis, Hoxie, Faithfull & Hapgood

[57] ABSTRACT

The present invention relates to a continuous weighing system and more specifically to a combination of a "wild-flow" flow of material and a loss-in-weight monitoring system. An uncontrolled flow of material from a wild-flow stream is accurately weighed and discharged by the loss-in-weight system.

6 Claims, 1 Drawing Sheet

WILD-FLOW LOSS-IN-WEIGHT WEIGHING SYSTEM

The present invention relates to a continuous weighing system in which a "wild-flow" stream of material and a loss-in-weight weighing system are serially connected, whereby the uncontrolled flow of material from the wild-flow source is accurately monitored and weighed by the loss-in-weight system.

BACKGROUND OF THE INVENTION

The feeding and/or weighing of solids and liquids is a task encountered in a myriad of industrial processes, for example, the production of foods, chemicals, plastics, explosives, pharmaceuticals, and a wide array of other products. Often in such applications, the rate at which material is fed from a supply hopper must be accurately controlled. In other applications, the flow of material is performed in an unregulated, uncontrolled fashion, known in the trade as "wild-flow." A "wild-flow" weigher is one in which a continuous supply of materials is delivered continuously, but in an unregulated fashion.

In those applications where controlled feeding or weighing is desired, two fundamental types of continuous metering mechanisms exist: volumetric feeders and gravimetric feeders. Volumetric feeders dispense material by volume and without use of feedback control. Feeders which do monitor their own feeding performance and automatically correct for variations from the desired performance are called "gravimetric" or weigh feeders. Several types of gravimetric feeders exist, the earliest to have been developed being the weigh-belt and weigh-auger. Weigh-belt and weigh-auger feeders measure the weight of material on a belt or in an auger during operation, that is, while it is feeding material, and compare that weight to an expected or "set" weight. In the case of a weigh-belt, the scale measures the weight of the belt or a section of the belt loaded with material and compares it with the expected or "set" weight. If the measured weight of the belt plus the material on the belt is more or less than the expected (or set) weight, a command is generated calling for more or less material per unit time to be fed onto the belt from the feed source. Exemplary weigh-belt and weigh-auger feeders are disclosed in U.S. Pat. Nos. 3,494,507 and 3,710,983 assigned to the assignee of the present invention.

A common problem with weigh-belt and weigh-auger feeders is material accumulating on the belt, auger or other critical components of the weighing mechanism and thereby changing the scale's "zero reference" and thus, the weight being monitored. If material is adhering to the belt auger or other scale components, the weight measured will be higher than appropriate for the amount of material actually being fed because the scale's "zero" has increased improperly. The problem is even worse if this accumulation builds up and falls off the belt or auger intermittently, thereby causing the "zero" weight of the belt or auger to fluctuate. In short, this type of gravimetric system, while using feedback principles to offer some control, has substantial limitations.

The most accurate form of gravimetric feeding is the loss-in-weight system, in which the gradual decrease in weight measured by a scale caused by the constant release of material from the scale mounted container (hopper or tank) is monitored and compared to an expected decrease in weight to assess performance. Loss-in-weight feeders are not in any way affected by the build-up of material, whether continuous or intermittent, because they monitor not absolute weight, but the change of weight over time. Exemplary loss-in-weight feeders, which include control means for protecting such systems even against extraneous disturbances of the type which long plagued the weight-loss weigh feeding industry, are shown in U.S. Re. Pat. Nos. 30,967, 32,101 and 32,102 and U.S. patent appl. Ser. No. 889,471, all assigned to the assignee of the present invention.

The present invention combines a wild-flow stream of material and loss-in-weight weighing to produce a system having unique accuracy-producing weighing characteristics.

SUMMARY OF THE PRESENT INVENTION

The present invention utilizes a serial arrangement of a wild-flow means for product flow followed by an independently supported loss-in-weight monitoring-/feeding system. The wild-flow arrangement operates in its usual uncontrolled fashion, and its output is delivered, through suitable intermediate mechanisms, to a separately supported loss-in-weight monitoring/feeding device, to create in combination what might be called a "loss-in-weight wild-flow weigher." The loss-in-weight wild-flow weigher provides a means for obtaining an accurate continuous measure of the flow of material passing through its mechanism despite the wild-flow or unregulated nature of the source.

DETAILED DESCRIPTION

Figure 1:
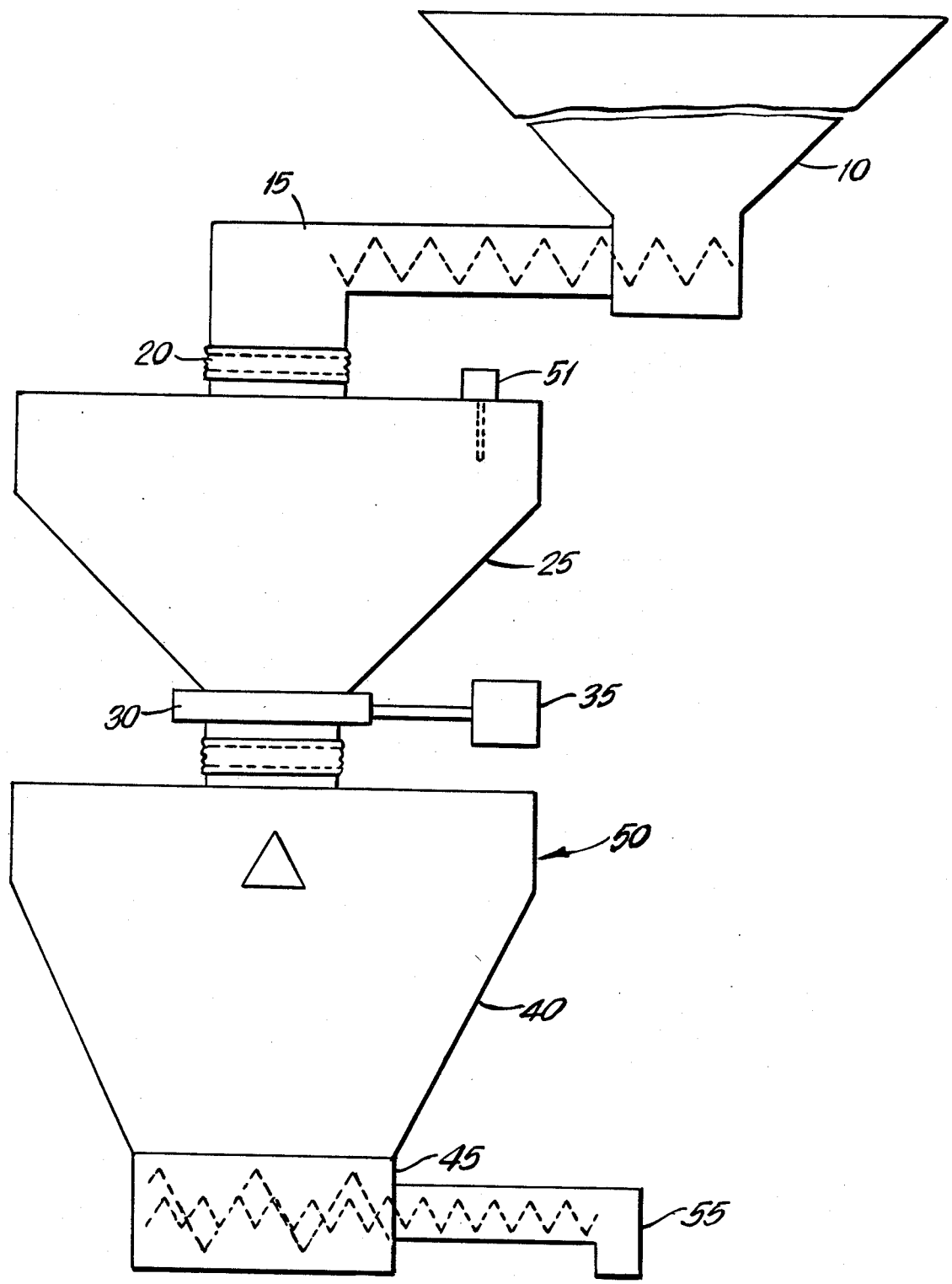
FIG. 1 is a schematic representation of the system of the present invention.

Referring to FIG. 1, the system of the present invention comprises a wild-flow feed source 10 suitably connected to a conveying means 15. The output end of the wild-flow conveyor 15 delivers material to a surge hopper 25 through an input connection 20. Surge hopper 25 is equipped at its output end with a discharge valve 30, for example a slide gate, which prevents material from being discharged from hopper 25 except on command. Beneath discharge valve 30 is the supply hopper 40 of a loss-in-weight weighing (and feed) system generally shown as 50. Beneath supply hopper 40 is the feeding or discharging mechanism 45 of the loss-in-weight system, and conveying means 55 is shown as ultimately removing material from the weight-loss system. The loss-in-weight system 50 is supported separately from the upstream components just described (through and including discharge valve 30 and its control mechanism 35), as for example by a flexure weighing system of the type described in U.S. Pat. Nos. 4,042,051 and 4,449,597 assigned to the assignee of the present invention.

In operation, an uncontrolled flow of material is delivered in a generally continous fashion through conveying means 15 into surge hopper 25. It is to be expected that the wild flow of material from conveying means 15 will vary, but not in any regular fashion. In order to determine the weight, rate, or both of the wild-flow feed by use of the loss-in-weight system 50, the flow of material into the supply hopper 40 of the loss-in-weight system must be interdicted. This function is performed by surge hopper 25 in conjunction with discharge valve 30. Discharge valve 30 is normally closed, thereby isolating the separately suspended loss-in-weight weighing system from a continuous inflow of material. During the periods when the discharge valve 30 is closed, material fed by wild-flow conveying means 15 accumulates in surge hopper 25, but that hopper is supported separately from the loss-in-weight system 50 so that the weight of the material in surge hopper 25 does not affect the weight measured by the loss-in-weight system 50 so that the weight of the material in surge hopper 25 does not affect the weight measured by the loss-in-weight system through its flexure or other suspension system. During such periods, the weight measured by the loss-in-weight system reflects the weight added when the valve was last opened, together with its weight prior to that event.

Periodically, discharge valve 30 is opened, permitting material to flow from surge hopper 25 into the supply hopper 40 of the loss-in-weight weighing system. The open time is made sufficient to permit the entire stored contents of the surge hopper to pass into the loss-in-weight weighing system supply hopper. In effect, the opening of the discharge valve commences a refill cycle for the loss-in-weight weighing system 50. Shortly after the discharge valve is closed, in effect ending the refill cycle, the weight of material in supply hopper 40 of the loss-in-weight weight system is recorded and, by control mechanisms well known in the field and disclosed in the patents cited above, the weight of material added during the refill—and hence the rate of flow (in weight units) of the wild-flow stream during the preceding time interval—can readily be determined. In addition, based on the weight of the last discharge from surge hopper 25, an appropriate output rate for the loss-in-weight discharging mechanism can be set so that the loss-in-weight system outputs, over the next time period, an amount of material approximately equal to that amount delivered to the system from the wild-flow source 10 and conveyor 15 during the preceding cycle of operation.

A high level probe 51 is included in surge hopper 25 to indicate either that the product is not flowing or discharging properly from within the hopper, or that discharge valve 30 is not remaining open for a sufficient duration. Correction can be completed automatically or manually depending upon the control system operational parameters.

During those periods when the discharge valve 30 is closed, the loss-in-weight system 50 discharges material in a normal fashion, at a rate corresponding to the uncontrolled flow of material periodically entering its Supply Hopper 40. Normally, the output rate of the wild-flow weight-loss weighing system is checked after each cycle and adjusted as necessary to maintain the weight in supply hopper 40 just after refill within preselected parameters. In overall terms, as can now be appreciated, the present invention is a materials-handling system in which the system monitors an uncontrolled input by weight and adjusts the output to match the uncontrolled input. The output rate (weighed flow) of the wild-flow weight-loss weighing system just described is a direct function of its wild-flow input.

If the flow of material into the wild-flow system should be interrupted for some reason, the loss-in-weight weighing system 50 would sense, in the next cycle of operation, the absence of refill to its supply hopper 40, and would adjust accordingly, by decreasing its output rate or by signalling an alarm in response to such a low weight condition. Conversely, if the flow of material from the wild-flow source 10 exceeded designed limits for some reason, the loss-in-weight system 50 would, on the next refill cycle, sense a large weight increase, would adjust accordingly, and could again signal an alarm.

As will be apparent to one skilled in the art, the size of the intermediate surge hopper 25, supply hopper 40 and their interconnections, and also the refill interval, will be determined by the expected range of material discharged by wild-flow conveyor 15.

We claim:

1. A continous weighing means for monitoring and determining the weight flow rate of a generally continuous wild-flow stream of solid or liquid materials comprising:

a generally continuous wild-flow source having an output;

a separately supported loss-in-weight weighing system having a supply means connected to the output of the wild-flow source by serial connection means, and a discharge means for controlling the discharge rate of material from the loss-in-weight supply means;

the serial connection means comprising a surge hopper for receiving material discharged from the output of the wild-flow source during each of a plurality of time periods and having a controllable discharge means at its lower end connected to the supply means of the loss-in-weight weighing system;

means for controlling the operation of the controllable discharge means;

the control means being operable to cause the controllable discharge means to discharge intermittently the entire volume of material received from the output of the wild-flow source during the preceding time period into the supply means of the loss-in-weight weighing system; and the loss-in-weight weighing system includes means for sensing the weight of the volume of material discharged into its supply means from the surge hopper and controllably adjusting the rate of output of the loss-in-weight system responsive to said sensing means.

2. The system of claim 1 wherein said means for adjusting the discharge rate of the loss-in-weight weighing system causes the loss-in-weight to discharge over the next time period the amount of material discharged by the wild-flow source over the preceding time period.

3. The system of claim 1 further including means for detecting when the level of material in the surge hopper exceeds a predetermined height and for causing the control means to maintain the controllable discharge means in its open position for a longer period of time during the next discharge of material into the supply means of the loss-in-weight weighing system.

4. A method of monitoring and weighing the unregulated flow of solid or liquid material in a system comprising a generally continuous wild-flow source of material having an output serially connected through serial connection means to a supply means of a separately supported loss-in-weight weighing system having discharge means controlling the rate of flow therefrom, said serial connection means having a surge hopper with an input for receiving material discharged from the output of the wild-flow source and controllable discharge means at its lower end connected to the supply means of the loss-in-weight weighing system, the method comprising the steps of:

permitting the wild-flow source to feed material out of its output into the input of the surge hopper during each of a plurality of time periods;

opening the controllable discharge means at the end of each time period to permit the entire volume of material in the surge hopper at the end of each time period to pass into the supply means of the loss-in-weight weighing system;

closing the discharge means; and monitoring the weight increase of the loss-in-weight weighing system to thereby determine the weight of material discharged by the wild-flow during the preceding time period and thereafter adjusting the rate of output of the loss-in-weight discharge means in response to the amount of material recieved by the loss-in-weight supply means.

5. The method of claim 4 wherein the duration of each time period is adjustable according to the weight increase monitored by the loss-in-weight system during each passage of material from the surge hopper into the supply means.

6. The method of claim 4 further comprising the steps of:

monitoring the weight increase of the loss-in-weight system over successive time periods to determine the weight of material discharged by the wild-flow source during successive preceding time periods, and varying the output rate of the loss-in-weight weighing system in accordance with the rate of flow of the wild-flow source received in the successive time periods.

* * * * *